United States Patent
Tang (10) Patent No.: US 11,956,793 B2
(45) Date of Patent: Apr. 9, 2024

(54) INFORMATION PROCESSING METHOD, DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 432 days.

(21) Appl. No.: 17/213,192

(22) Filed: Mar. 25, 2021

(65) Prior Publication Data

US 2021/0219274 A1 Jul. 15, 2021

Related U.S. Application Data

(63) Continuation of application No. PCT/CN2018/108062, filed on Sep. 27, 2018.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .............................. H04W 72/23; H04B 7/0632
USPC ......................................... 370/280, 329, 328
See application file for complete search history.

(56) References Cited

U.S. PATENT DOCUMENTS

| 2020/0366398 | A1* | 11/2020 | Takeda | H04L 5/0094 |
| 2020/0413359 | A1* | 12/2020 | Li | H04L 5/0094 |
| 2021/0234659 | A1* | 7/2021 | Tang | H04L 5/0091 |

FOREIGN PATENT DOCUMENTS

| CN | 108390747 | 8/2018 |
| CN | 108401487 | 8/2018 |
| CN | 108401526 | 8/2018 |
| CN | 108513362 | 9/2018 |
| CN | 108513719 | 9/2018 |
| CN | 108521887 | 9/2018 |
| EP | 3745790 | 12/2020 |
| WO | 2018106043 | 6/2018 |

OTHER PUBLICATIONS

QUALCOMM Incorporated, "Remaining system information delivery consideration," 3GPP TSG-RAN WG1 NR#90, R1-1713376, Aug. 2017, 8 pages.
WIPO, International Search Report and Written Opinion of PCT/CN2018/108062, dated Jun. 13, 2019.
VIVO, "Discussion on Remaining Minimum System Information," 3GPP TSG RAN WG1 Meeting #90bis, R1-1717461, Oct. 2017.
(Continued)

*Primary Examiner* — Kiet M Doan
(74) *Attorney, Agent, or Firm* — Hodgson Russ LLP (57) ABSTRACT

Disclosed is an information processing method, comprising : receiving, in one time slot, at most two synchronization signal blocks (SSBs) sent by a network device, and detecting a physical downlink control channel (PDCCH) of RMSI on a minimum system information control resource set (CORE-SET of RMSI) in one-to-one association with the at most two SSBs. Further disclosed are another information processing method and device and a storage medium.

8 Claims, 4 Drawing Sheets

(56) References Cited

OTHER PUBLICATIONS

"3rd Generation Partnership Project; Technical Specification Group Radio Access Network; NR; Physical layer procedures for control (Release 15)," 3GPP TS 38.213, Jun. 2018, v15.2.0.

EPO, Extended European Search Report for EP Application No. 18935271.9, dated Oct. 4, 2021.

EPO, Communication for EP Application No. 18935271.9, Oct. 6, 2023.

\* cited by examiner

Receiving at most two SSBs sent by a network device in one slot, and detecting PDCCHs of RMSI on CORESETs of the RMSI in one-to-one association with the at most two SSBs — S201

INFORMATION PROCESSING METHOD, DEVICE AND STORAGE MEDIUM

CROSS-REFERENCE TO RELATED APPLICATIONS

The present application is a continuation of International Application No. PCT/CN2018/108062, filed on Sep. 27, 2018, the entire disclosure of which is incorporated herein by reference.

TECHNICAL FIELD

The present disclosure relate to the field of wireless communication technologies, and more particularly, to an information processing method, device and storage medium.

BACKGROUND

In a New Radio (NR) Rel-15 system, time-domain candidate positions for sending a synchronization signal block (SS/PBCH block, SSB) and time-domain candidate positions of a control resource set (CORESET) where a physical downlink control channel (PDCCH) of remaining minimum system information (RMSI) associated with the SSB is located are specified.

SUMMARY

Embodiments of the present disclosure provide an information processing method, device, and storage medium.

In a first aspect, the embodiments of the present disclosure provide an information processing method, including: receiving, by a terminal device, at most two SSBs sent by a network device in one slot, and detecting PDCCHs of RMSI on CORESETs of the RMSI in one-to-one association with the at most two SSBs.

In a second aspect, the embodiments of the present disclosure provide an information processing method, including: determining, by a network device, candidate position information of at most two SSBs and candidate position information of CORESETs of RMSI in one-to-one association with the at most two SSBs in one slot, so that the at most two SSBs and PDCCHs of the RMSI on the CORESETs of the RMSI in one-to-one association with the at most two SSBs are configured and transmitted in one slot.

In a third aspect, the embodiments of the present disclosure provide a terminal device. The terminal device includes: a receiving unit, configured to receive at most two SSBs sent by a network device in one slot, and detecting PDCCHs of RMSI on CORESETs of the RMSI in one-to-one association with the at most two SSBs.

In a fourth aspect, the embodiments of the present disclosure provide a network device, including: a processing unit configured to determine candidate position information of at most two SSBs and candidate position information of CORESETs of RMSI in one-to-one association with the at most two SSBs in one slot, so that the at most two SSBs and PDCCHs of the RMSI on the CORESETs of the RMSI in one-to-one association with the at most two SSBs are configured and transmitted in one slot.

In a fifth aspect, the embodiments of the present disclosure provide a terminal device, including: a processor and a memory configured to store a computer program that can run on the processor, wherein the processor is configured to run the above computer program to execute steps of the method performed by the terminal device.

In a sixth aspect, the embodiments of the present disclosure provide a network device, including: a processor and a memory configured to store a computer program that can run on the processor, wherein the processor is configured to run the above computer program to execute steps of the method performed by the network device.

In a seventh aspect, the embodiments of the present disclosure provide a storage medium that stores an executable program which, when executed by a processor, implements the method performed by the terminal device above.

In an eighth aspect, the embodiments of the present disclosure provide a storage medium that stores an executable program which, when executed by a processor, implements the method performed by the network device above.

DETAILED DESCRIPTION

In order to understand features and technical content of embodiments of the present disclosure in more detail, implementations of the embodiments of the present disclosure will be described in detail below with reference to the accompanying drawings. The accompanying drawings are only for purposes of reference and explanation, and are not used for limiting the embodiments of the present disclosure.

Before describing the embodiments of the present disclosure in detail, a brief description of a candidate sending position of the SSB in a one slot will be given.

In the 5G NR system, the candidate sending position of the SSB is planned and configured within 5 ms, and a candidate configuration position of the CORESET of the RMSI associated with the SSB is planned and configured within 20 ms. A time domain interval between the positions of a certain SSB and the CORESET of the RMSI associated with the SSB varies greatly according to different configurations. In a study of 5G unlicensed frequency bands, due to limited transmission opportunities after a success of a listen before talk (LBT) mechanism, especially after the CAT-2 LBT, the SSB and CORESET of RMSI associated are configured and sent as a whole, which will facilitate efficient use of resources and avoid frequent beam switching.

Figure 1:
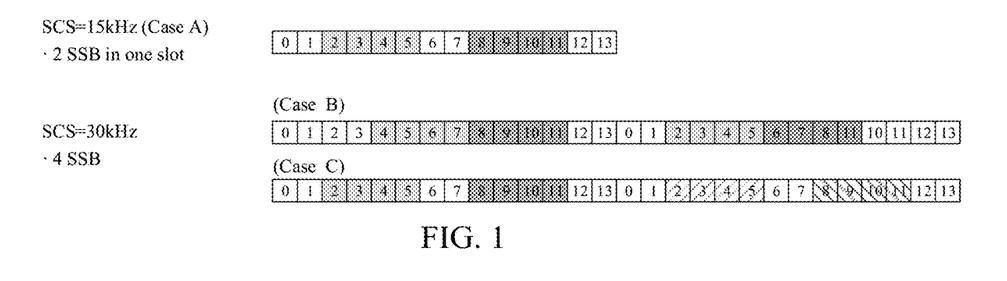
FIG. 1 is a schematic diagram of a candidate sending position of SSB in one slot in the related art.

In the related art, the candidate sending position of the SSB in one slot is shown in FIG. 1. The candidate configuration position of the CORESET of RMSI is: first two slot positions of the $(n_0=(O \cdot 2^\mu + \lfloor i \cdot M \rfloor) \bmod N_{slot}^{frame,\mu})$th slot with a system frame number meeting $SFN_C \bmod 2=0$ (when $\lfloor (O \cdot 2 \lfloor i \cdot M \rfloor)/N_{slot}^{frame,\mu} \rfloor \bmod 2=0$), or $SFN_C \bmod 2=1$ (when $\lfloor (O \cdot 2^\mu + \lfloor i \cdot M \rfloor)/N_{slot}^{frame,\mu} \rfloor \bmod 2=1$).

In the 5G NR system, it is supported that there are positions of the CORESETs of two SSB's RMSIs in one slot, which is specifically described in section 13 of the 3GPP protocol 38.213. When the system is configured such that CORESETs of two SSB's RMSIs exists in one slot, the CORESET of a first RMSI is configured to start at a first symbol in the slot and have a length L; the CORESET of a second RMSI is configured to start at (L+1) th symbol in the slot, or at an 8th symbol in the slot, and have a length L. L may be a length of 1 symbol, 2 symbols or 3 symbols.

The applicant found that in the related art, although it is supported that two SSBs can be sent in one slot, and the CORESET of the RMSI associated with two SSBs can also be configured in one slot; however, because there are separate constraints for the configuration of SSB and the configuration of the CORESET of the RMSI in the above configuration, it is not possible to support simultaneously transmission of two SSBs and configure the CORESET of the RMSI associated with the two SSBs and with a time domain length greater than one symbol in one slot.

Based on the above problems, the present disclosure provides an information processing method. The information transmission method in the embodiments of the present application can be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a 5G system, or the like.

Figure 2:
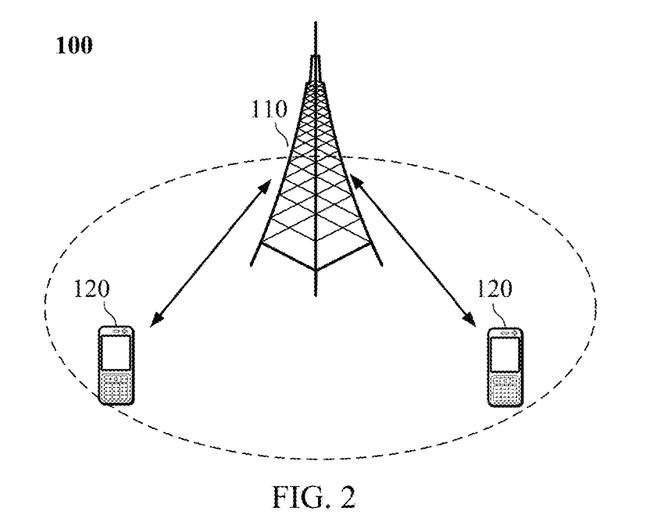
FIG. 2 is a schematic diagram of a composition structure of a communication system according to an embodiment of the present disclosure.

Exemplarily, a communication system 100 applied in an embodiment of the present disclosure is shown in FIG. 2. The communication system 100 may include a network device 110. The network device 110 may be a device communicating with user equipment (UE) 120 (or referred to as a communication terminal or a terminal). The network device 110 may provide communication coverage to a specific geographic region, and may communicate with UE located within the coverage region. Optionally, the network device 110 may be a base transceiver station (BTS) in a global system for mobile communications (GSM) or a code division multiple access (CDMA) system, or a nodeB (NB) in a wideband code division multiple access (WCDMA) system, or an evolutional nodeB (eNB or eNodeB) in a long term evolution (LTE) system, or a radio controller in a cloud radio access network (CRAN). Or, the network device may be a mobile switching center, a relay station, an access point, a vehicle device, a wearable device, a concentrator, a switchboard, a network bridge, a router, a network-side device in a 5th generation (5G) network, or a network device in a public land mobile network (PLMN) that will be evolved in the future, and the like.

The communication system 100 further includes at least one UE 120 located within a coverage range of the network device 110. The "UE" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another UE, which is configured to receive/transmit a communication signal; and/or an Internet of things (IoT) device. The UE configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a radiotelephone, a pager, an Internet/intranet access, a Web browser, a notepad, a calendar, and/or a personal digital assistant (PDA) of a global positioning system (GPS) receiver; and a conventional laptop and/or palmtop receiver or other electronic apparatuses including radiotelephone transceivers. The UE may refer to an access terminal, a user equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, UE in a 5G network, or UE in the PLMN that will be evolved in the future, and the like.

Optionally, device to device (D2D) communication may be realized among the UE 120.

Optionally, a 5G system or 5G network may also be referred to as a new radio (NR) system or NR network.

FIG. 2 exemplarily illustrates one network device and two of UEs. Optionally, the communication system 100 may include a plurality of network devices, and a coverage range of each network device may include other numbers of UEs, which is not limited by the embodiment of the present disclosure.

Optionally, the communication system 100 may also include other network entities such as a network controller and a mobile management entity, which is not limited by the embodiment of the present disclosure.

It should be understood that a device having a communication function in a network/system in the embodiment of the present disclosure may be referred to as a communication device. The communication system 100 shown in FIG. 2 is taken as an example. The communication device may include a network device 110 and UE 120 which have communication functions. The network device 110 and the UE 120 may be the above-mentioned specific devices, and descriptions thereof are omitted here. The communication device may also include other devices in the communication system 100, such as other network entities including the network controller, the mobile management entity, and the like, which is not limited by the embodiment of the present disclosure.

Figure 3:
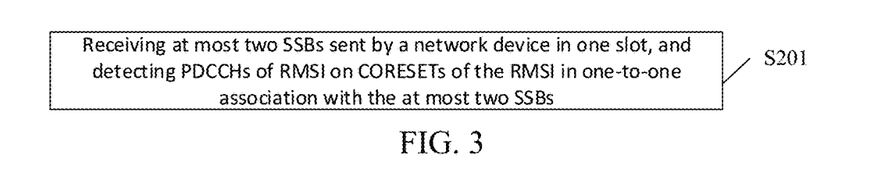
FIG. 3 is a schematic diagram of an optional processing flow of an information transmission method applied to a terminal device according to an embodiment of the present disclosure.

As shown in FIG. 3, an optional processing flow of the information processing method applied to a terminal device provided by the embodiments of the present disclosure includes the following steps:

in step S201, the terminal device receives at most two SSBs sent by a network device in one slot, and detects PDCCHs of RMSI on CORESETs of the RMSI in one-to-one association with the at most two SSBs.

Figure 4:
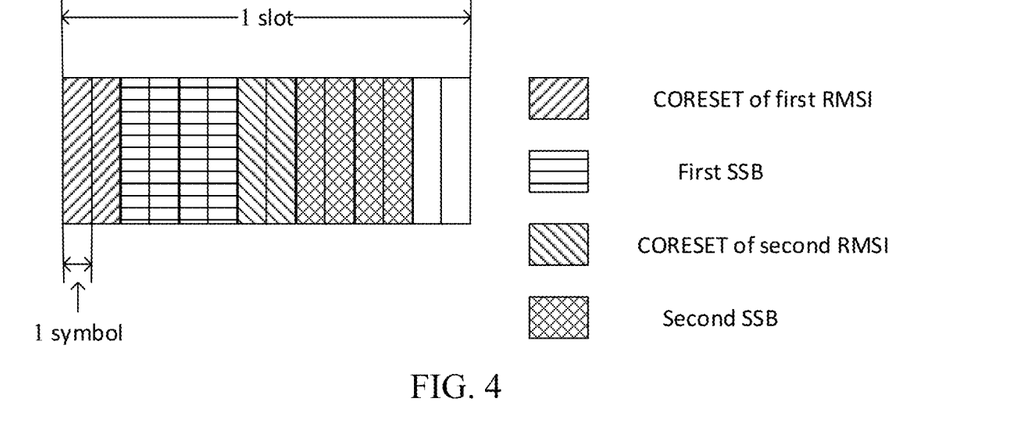
FIG. 4 is an optional schematic diagram 1 of candidate position information of SSB and CORESET of RMSI associated with the SSB in one slot.

In some embodiments, a first optional schematic diagram of candidate position information of the SSB and candidate position information of the CORESET of the RMSI associated with the SSB within one is shown in FIG. 4. Candidate position information of the at most two SSBs in the one slot includes: a first SSB of the at most two SSBs is located on a third symbol to a sixth symbol in the one slot; and/or, a second SSB of the at most two SSBs is located on a ninth symbol to a twelfth symbol in the one slot.

Correspondingly, candidate position information of the CORESETs of the RMSI in one-to-one association with the at most two SSBs includes: a start symbol of a CORESET of first RMSI associated with the first SSB is located on a first symbol in the slot; and/or, a start symbol of a CORESET of second RMSI associated with the second SSB is located on a seventh symbol in the slot.

Alternatively, candidate position information of the CORESETs of the RMSI in one-to-one association with the at most two SSBs includes: a start symbol of a CORESET of first RMSI associated with the first SSB is located on a seventh symbol in the slot; and/or, a start symbol of a CORESET of second RMSI associated with the second SSB is located on a first symbol in the slot.

Here, a time domain length of the CORESET of the first RMSI is configured to occupy one symbol or two symbols by the network device, and a time domain length of the CORESET of the second RMSI is configured to occupy one symbol or two symbols by the network device.

Figure 5:
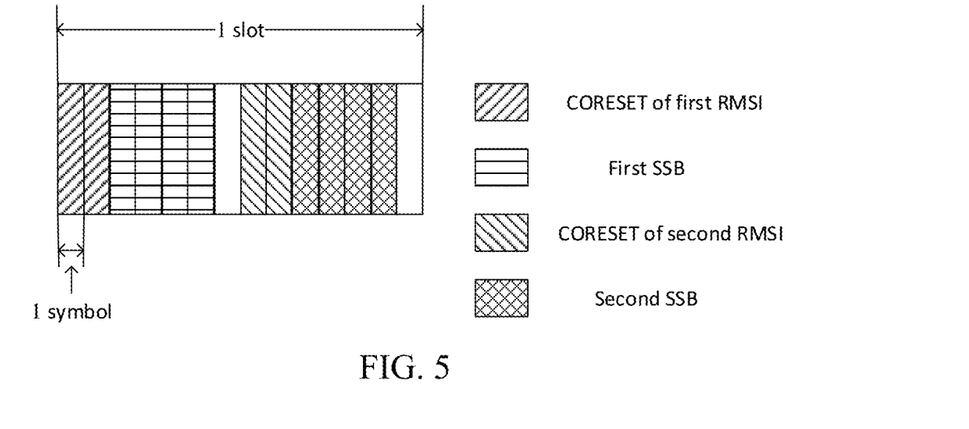
FIG. 5 is an optional schematic diagram 2 of candidate position information of SSB and CORESET of RMSI associated with the SSB in one slot.

In other embodiments, a second optional schematic diagram of candidate position information of the SSB and candidate position information of the CORESET of the RMSI associated with the SSB within one is shown in FIG. 5. Candidate position information of the at most two SSBs in the one slot includes: a first SSB of the at most two SSBs is located on a third symbol to a sixth symbol in the one slot; and/or, a second SSB of the at most two SSBs is located on a tenth symbol to a thirteenth symbol in the one slot.

Correspondingly, candidate position information of the CORESETs of the RMSI associated with the at most two SSBs includes:

a start symbol of a CORESET of first RMSI associated with the first SSB is located on a first symbol in the slot; and/or, a start symbol of a CORESET of second RMSI associated with the second SSB is located on an eighth symbol in the slot.

Alternatively, candidate position information of the CORESETs of the RMSI associated with the at most two SSBs includes: a start symbol of a CORESET of first RMSI associated with the first SSB is located on an eighth symbol in the slot; and/or, a start symbol of a CORESET of second RMSI associated with the second SSB is located on a first symbol in the slot.

Here, a time domain length of the CORESET of the first RMSI is configured to occupy one symbol or two symbols by the network device, and a time domain length of the CORESET of the second RMSI is configured to occupy one symbol or two symbols by the network device.

Figure 6:
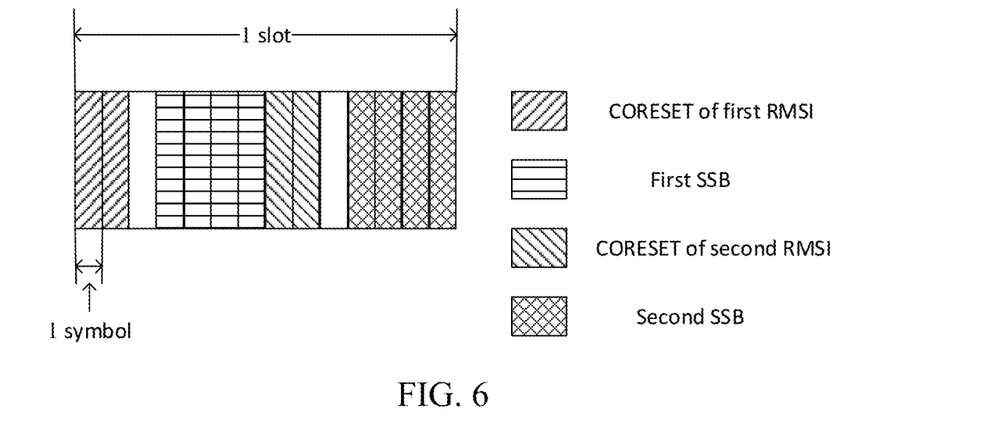
FIG. 6 is an optional schematic diagram 3 of candidate position information of SSB and CORESET of RMSI associated with the SSB in one slot.

In still other embodiments, a third optional schematic diagram of candidate position information of the SSB and candidate position information of the CORESET of the RMSI associated with the SSB within one is shown in FIG. 6. Candidate position information of the at most two SSBs in the one slot includes: a first SSB of the at most two SSBs is located on a fourth symbol to a seventh symbol in the one slot; and/or, a second SSB of the at most two SSBs is located on an eleventh symbol to a fourteenth symbol in the one slot.

Correspondingly, candidate position information of the CORESETs of the RMSI in one-to-one association with the at most two SSBs includes: a start symbol of a CORESET of first RMSI associated with the first SSB is located on a first symbol in the slot; and/or, a start symbol of a CORESET of second RMSI associated with the second SSB is located on an eighth symbol in the slot.

Alternatively, candidate position information of the CORESETs of the RMSI in one-to-one association with the at most two SSBs includes: a start symbol of a CORESET of first RMSI associated with the first SSB is located on an eighth symbol in the slot; and/or, a start symbol of a CORESET of second RMSI associated with the second SSB is located on a first symbol in the slot.

In the embodiment of the present disclosure, a time domain length of the CORESET of the RMSI is configured by the network device such that a time domain length of the CORESET of the first RMSI occupies at most three symbols; and/or, a time domain length of the CORESET of the second RMSI The time domain length occupies at most three symbols.

Based on the above-mentioned embodiments of the present disclosure, it can be known that the terminal can simultaneously receive one SSB and the CORESET of the RMSI associated with the SSB in one slot; the terminal can also simultaneously receive two SSBs and the CORESETs of the two pieces of RMSI in one-to-one correspondence with the two SSBs in one slot. Moreover, when two SSBs and the CORESETs of the two pieces of RMSI in one-to-one correspondence with the two SSBs are simultaneously received in one slot, the positions of the start symbols of the CORESETs of the two pieces of RMSI are not limited.

For example, when the start symbols of the CORESETs of the two pieces of RMSI are located on the first symbol and the seventh symbol in one slot, respectively, it may be that the CORESET of the first RMSI among the CORESETs of the two pieces of RMSI is located on the first symbol in the slot, the CORESET of the second RMSI among the CORESETs of the two pieces of RMSI is located on the seventh symbol in the slot; it may also be that the CORESET of the second RMSI among the CORESETs of the two pieces of RMSI is located on the first symbol in the slot, the CORESET of the first RMSI among the CORESETs of the two pieces of RMSI is located on the seventh symbol in the slot. It can be understood that the position of the CORESETs of the two pieces of RMSI within one slot are not related to the positions of the SSBs associated with the CORESETs of the two pieces of RMSI.

In the embodiments of the present disclosure, it is supported to simultaneously transmit/receive two SSBs and the CORESET of the RMSI in one-to-one correspondence with the two SSBs in one slot; in this way, it is conducive to limited use of the time-frequency resources after successful LBT, so that individual SSBs and the CORESET of the RMSI associated with the respective SSB are transmitted/received as a unified NR-U DRS.

Figure 7:
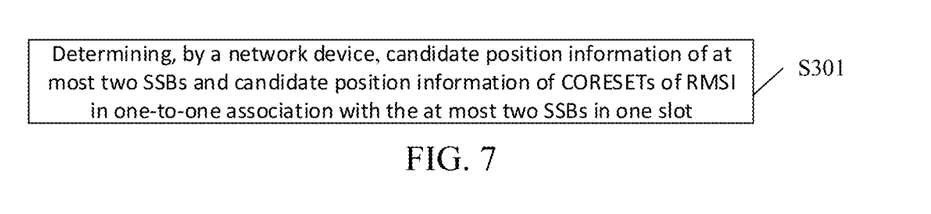
FIG. 7 is a schematic diagram of an optional processing flow of an information transmission method applied to a network device according to an embodiment of the present disclosure.

An optional processing flow of an information processing method applied to a network device provided by an embodiment of the present disclosure is as shown in FIG. 7, and the information processing method includes:

in step S301, the network device determines candidate position information of at most two SSBs and candidate position information of CORESETs of RMSI in one-to-one association with the at most two SSBs in one slot.

In the embodiments of the present disclosure, regarding to the candidate position information of the at most two SSBs, and the candidate position information of the CORESETs of the RMSI in one-to-one association with the at most two SSBs determined by the network device, reference can be made to the above step S201 and FIGS. 4-6, and details are not repeated here.

Based on the above embodiments of the present disclosure, it can be known that the terminal can simultaneously receive one SSB and detect the PDCCH of the RMSI on the CORESET of the RMSI associated with the SSB in one slot; the terminal can also simultaneously receive two SSBs and detect the PDCCH of the RMSI on the CORESET of the RMSI in one-to-one correspondence with the two SSBs in one slot. Moreover, when the reception of the two SSBs and the detection of the PDCCH of the RMSI on the CORESET of the RMSI in one-to-one correspondence with the two SSBs are simultaneously performed in one slot, the positions of the start symbols of the CORESETs of the two pieces of RMSI are not limited.

In the embodiments of the present disclosure, it is supported to simultaneously transmit/receive two SSBs and the CORESET of the RMSI in one-to-one correspondence with the two SSBs in one slot; in this way, it is conducive to limited use of the time-frequency resources after successful LBT, so that individual SSBs and the CORESET of the RMSI associated with the respective SSB are transmitted/received as a unified NR-U DRS.

In some embodiments, after the network device performs the step S301, the method further includes:

the network device sends the at most two SSBs in one slot, and the PDCCH of the RMSI on the CORESETs of the RMSI in one-to-one association with the at most two SSBs to a terminal device.

Figure 8:
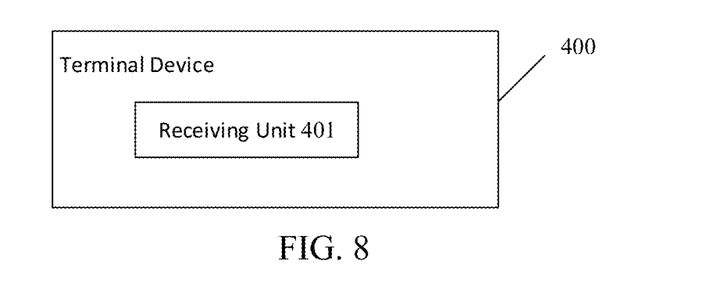
FIG. 8 is a schematic diagram of a composition structure of a terminal device provided by an embodiment of the present disclosure.

The embodiments of the present disclosure provide a terminal device. A schematic diagram of a composition structure of the terminal device 400 is as shown in FIG. 8, and the terminal device 400 includes:

a receiving unit 401, configured to receive at most two SSBs sent by a network device in one slot, and detect PDCCHs of RMSI on CORESETs of the RMSI in one-to-one association with the at most two SSBs.

In some embodiments, candidate position information of the at most two SSBs in the one slot includes:

a first SSB of the at most two SSBs is located on a third symbol to a sixth symbol in the one slot; and/or, a second SSB of the at most two SSBs is located on a ninth symbol to a twelfth symbol in the one slot.

Correspondingly, candidate position information of the CORESETs of the RMSI in one-to-one association with the at most two SSBs includes:

a start symbol of a CORESET of first RMSI associated with the first SSB is located on a first symbol in the slot; and/or, a start symbol of a CORESET of second RMSI associated with the second SSB is located on a seventh symbol in the slot.

Alternatively, candidate position information of the CORESETs of the RMSI in one-to-one association with the at most two SSBs includes:

a start symbol of a CORESET of first RMSI associated with the first SSB is located on a seventh symbol in the slot; and/or, a start symbol of a CORESET of second RMSI associated with the second SSB is located on a first symbol in the slot.

Here, a time domain length of the CORESET of the first RMSI occupies at most two symbols; and/or, a time domain length of the CORESET of the second RMSI occupies at most two symbols.

In other embodiments, candidate position information of the at most two SSBs in the one slot includes:

a first SSB of the at most two SSBs is located on a third symbol to a sixth symbol in the one slot; and/or, a second SSB of the at most two SSBs is located on a tenth symbol to a thirteenth symbol in the one slot.

Correspondingly, candidate position information of the CORESETs of the RMSI associated with the at most two SSBs includes:

a start symbol of a CORESET of first RMSI associated with the first SSB is located on a first symbol in the slot; and/or, a start symbol of a CORESET of second RMSI associated with the second SSB is located on an eighth symbol in the slot.

Alternatively, candidate position information of the CORESETs of the RMSI associated with the at most two SSBs includes:

a start symbol of a CORESET of first RMSI associated with the first SSB is located on an eighth symbol in the slot; and/or, a start symbol of a CORESET of second RMSI associated with the second SSB is located on a first symbol in the slot.

Here, a time domain length of the CORESET of the first RMSI occupies at most two symbols; and/or, a time domain length of the CORESET of the second RMSI occupies at most two symbols.

In still other embodiments, candidate position information of the at most two SSBs in the one slot includes:

a first SSB of the at most two SSBs is located on a fourth symbol to a seventh symbol in the one slot; and/or, a second SSB of the at most two SSBs is located on an eleventh symbol to a fourteenth symbol in the one slot.

Correspondingly, candidate position information of the CORESETs of the RMSI in one-to-one association with the at most two SSBs includes:

a start symbol of a CORESET of first RMSI associated with the first SSB is located on a first symbol in the slot; and/or, a start symbol of a CORESET of second RMSI associated with the second SSB is located on an eighth symbol in the slot.

Alternatively, candidate position information of the CORESETs of the RMSI in one-to-one association with the at most two SSBs includes:

a start symbol of a CORESET of first RMSI associated with the first SSB is located on an eighth symbol in the slot; and/or, a start symbol of a CORESET of second RMSI associated with the second SSB is located on a first symbol in the slot.

Here, a time domain length of the CORESET of the RMSI includes: a time domain length of the CORESET of the first RMSI occupies at most three symbols; and/or, a time domain length of the CORESET of the second RMSI occupies at most three symbols symbol.

Figure 9:
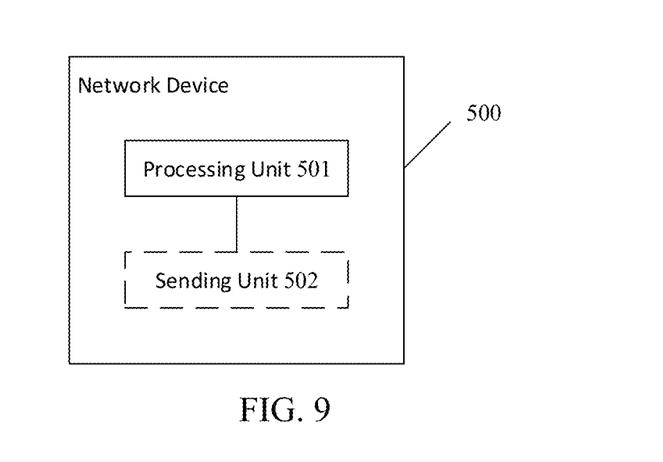
FIG. 9 is a schematic diagram of a composition structure of a network device provided by an embodiment of the present disclosure.

The embodiments of the present disclosure also provide a network device. A schematic diagram of a composition structure of a network device 500 is as shown in FIG. 9, and the network device 500 includes:

a processing unit 501, configured to determine candidate position information of at most two SSBs and candidate position information of CORESETs of RMSI in one-to-one association with the at most two SSBs in one slot, so that the at most two SSBs and PDCCHs of the RMSI on the CORESETs of the RMSI in one-to-one association with the at most two SSBs are transmitted in one slot.

candidate position information of the at most two SSBs in the one slot includes:

a first SSB of the at most two SSBs is located on a third symbol to a sixth symbol in the one slot; and/or, a second SSB of the at most two SSBs is located on a ninth symbol to a twelfth symbol in the one slot.

Correspondingly, candidate position information of the CORESETs of the RMSI in one-to-one association with the at most two SSBs includes:

a start symbol of a CORESET of first RMSI associated with the first SSB is located on a first symbol in the slot; and/or, a start symbol of a CORESET of second RMSI associated with the second SSB is located on a seventh symbol in the slot.

Alternatively, candidate position information of the CORESETs of the RMSI in one-to-one association with the at most two SSBs includes:

a start symbol of a CORESET of first RMSI associated with the first SSB is located on a seventh symbol in the slot; and/or, a start symbol of a CORESET of second RMSI associated with the second SSB is located on a first symbol in the slot.

Here, a time domain length of the CORESET of the first RMSI occupies at most two symbols; and/or, a time domain length of the CORESET of the second RMSI occupies at most two symbols.

In other embodiments, candidate position information of the at most two SSBs in the one slot includes:

a first SSB of the at most two SSBs is located on a third symbol to a sixth symbol in the one slot; and/or, a second SSB of the at most two SSBs is located on a tenth symbol to a thirteenth symbol in the one slot.

Correspondingly, candidate position information of the CORESETs of the RMSI associated with the at most two SSBs includes:

a start symbol of a CORESET of first RMSI associated with the first SSB is located on a first symbol in the slot; and/or, a start symbol of a CORESET of second RMSI associated with the second SSB is located on an eighth symbol in the slot.

Alternatively, candidate position information of the CORESETs of the RMSI associated with the at most two SSBs includes:

a start symbol of a CORESET of first RMSI associated with the first SSB is located on an eighth symbol in the slot; and/or, a start symbol of a CORESET of second RMSI associated with the second SSB is located on a first symbol in the slot.

Here, a time domain length of the CORESET of the first RMSI occupies at most two symbols; and/or, a time domain length of the CORESET of the second RMSI occupies at most two symbols.

In still other embodiments, candidate position information of the at most two SSBs in the one slot includes:

a first SSB of the at most two SSBs is located on a fourth symbol to a seventh symbol in the one slot; and/or, a second SSB of the at most two SSBs is located on an eleventh symbol to a fourteenth symbol in the one slot.

Correspondingly, candidate position information of the CORESETs of the RMSI in one-to-one association with the at most two SSBs includes:

a start symbol of a CORESET of first RMSI associated with the first SSB is located on a first symbol in the slot; and/or, a start symbol of a CORESET of second RMSI associated with the second SSB is located on an eighth symbol in the slot.

Alternatively, candidate position information of the CORESETs of the RMSI in one-to-one association with the at most two SSBs includes:

a start symbol of a CORESET of first RMSI associated with the first SSB is located on an eighth symbol in the slot; and/or, a start symbol of a CORESET of second RMSI associated with the second SSB is located on a first symbol in the slot.

Here, a time domain length of the CORESET of the RMSI includes: a time domain length of the CORESET of the first RMSI occupies at most three symbols; and/or, a time domain length of the CORESET of the second RMSI occupies at most three symbols symbol.

In the embodiment of the present disclosure, the network device further includes:

a sending unit 502, configured to send the at most two SSBs in one slot, and the PDCCH of the RMSI on the CORESETs of the RMSI in one-to-one association with the at most two SSBs to a terminal device.

The embodiments of the present disclosure also provide a terminal device, including a processor and a memory for storing a computer program that is capable of running on the processor, and the processor is configured to execute steps of the power distribution method executed by the terminal device when running the computer program.

The embodiments of the present disclosure also provide a network device, including a processor and a memory for storing a computer program that is capable of running on the processor, and the processor is configured to execute steps of the power distribution method executed by the network device when running the computer program.

Figure 10:
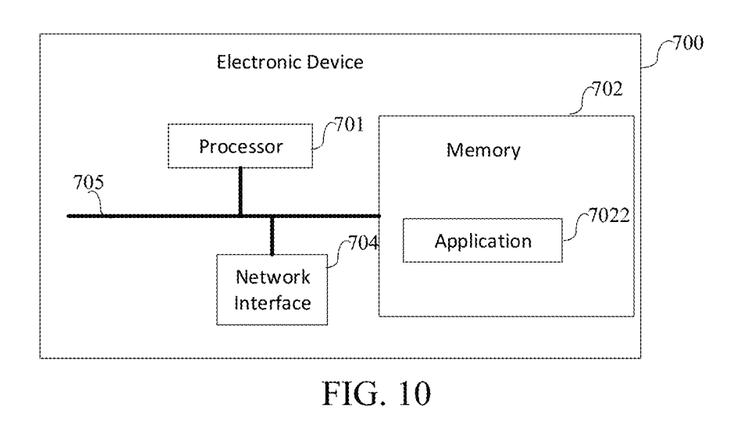
FIG. 10 is a schematic diagram of the hardware composition structure of an electronic device provided by an embodiment of the present disclosure.

FIG. 10 is a schematic diagram of a hardware composition structure of an electronic device (network device or terminal device) according to an embodiment of the present disclosure. The electronic device 700 includes: at least one processor 701, a memory 702, and at least one network interface 704. Various components in the electronic device 700 are coupled together by a bus system 705. It can be understood that the bus system 705 is configured to implement connection and communication between these components. In addition to a data bus, the bus system 705 also includes a power bus, a control bus, and a status signal bus. However, for clarity of description, various buses are marked as the bus system 705 in FIG. 10.

It should be understood that, the memory 702 may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), a ferromagnetic random access memory (FRAM), a flash memory, a ferromagnetic surface memory, optical disk, or an optical disk, or a compact disc read-only memory (CD-ROM); the ferromagnetic surface memory can be a disk memory or a tape memory. The volatile memory may be a random access memory (RAM), and is used as an external cache. By way of examples but of no limitation, many forms of RAM are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 702 described in the embodiment of the present disclosure is intended to include but is not limited to these memories and any other suitable type of memory.

The memory 702 in the embodiments of the present disclosure is configured to store various types of data to support the operations of the electronic device 700. Examples of these data include: any computer program used for operating on the electronic device 700, such as an application 7022. The program for implementing the method of the embodiments of the present disclosure may be included in the application 7022.

The method disclosed in the above embodiments of the present disclosure may be applied to the processor 701 or implemented by the processor 701. The processor 701 may be an integrated circuit chip, has a signal processing capability, the steps of the foregoing method embodiment may be implemented by using a hardware integrated logic circuit in the processor 701 and/or implemented by using an instruction in a software form. The foregoing processor 701 may be a general purpose processor, a digital signal processor (DSP) or another programmable logic device, a transistor logic device, or a discrete hardware component. The processor 701 may implement or execute the methods, steps, and logical block diagrams disclosed in the embodiments of the present disclosure. The general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a storage medium, and the storage medium is located in the memory 702, and the processor 701 reads information in the memory 702 and completes the steps in the foregoing method embodiments in combination with hardware of the processor.

In an exemplary embodiment, the electronic device 700 may be implemented by one or more application specific integrated circuits (ASIC), DSP, programmable logic devices (PLD), and complex programmable logic devices (CPLD), FPGA, general-purpose processors, controllers, MCUs, MPUs, or other electronic components to implement the aforementioned method.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer readable storage medium may be applied to the terminal device in the embodiments of the present disclosure, and the computer program enables the computer to execute a corresponding procedure implemented by the terminal device in the methods of the embodiments of the present disclosure. For brevity, details are not described herein again.

The present disclosure is described with reference to flowcharts and/or block diagrams of the methods, the device (system), and the computer program product according to the embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processing machine or other programmable data processing devices to generate a machine, so that the instructions executed by the processor of the computer or other programmable data processing devices generate means for realizing the functions specified in one or more processes in the flowchart and/or one or more blocks in the block diagram.

These computer program instructions can also be stored in a computer-readable memory that can guide a computer or other programmable data processing devices to work in a specific manner, so that the instructions stored in the computer-readable memory generate an article of manufacture including the instruction device, and the instruction device realizes the functions specified in one or more processes in the flowchart and/or one or more blocks in the block diagram.

These computer program instructions can also be loaded on a computer or other programmable data processing devices, so that a series of operation steps are executed on the computer or other programmable devices to produce computer-implemented processing, so that instructions executed on the computer or other programmable devices provide steps for implementing the functions specified in one or more processes in the flowchart and/or one or more blocks in the block diagram.

The foregoing descriptions are only the preferred embodiments of the present disclosure and are not used to limit the protection scope of the present disclosure. Any modification, equivalent replacement and improvement, etc. made within the spirit and principle of the present disclosure should be included in the protection scope of the present disclosure.

What is claimed is:

1. An information processing method, comprising:
   receiving, by a terminal device, two synchronization signal blocks (SSBs) sent by a network device in one slot, and detecting physical downlink control channels (PDCCHs) of remaining minimum system information (RMSI) on control resource sets (CORESETs) of the RMSI in one-to-one association with the two SSBs;
   wherein candidate position information of the two SSBs in the one slot comprises:
      a first SSB of the two SSBs is located on a fourth symbol to a seventh symbol in the one slot; and a second SSB of the two SSBs is located on an eleventh symbol to a fourteenth symbol in the one slob;
   wherein a time domain length of the CORESET of the RMSI comprises:
      at most three symbols are allocated for a time domain length of the CORESET of the first RMSI; and/or
      at most three symbols are allocated for a time domain length of the CORESET of the second RMSI.

2. The method according to claim 1, wherein candidate position information of the CORESETs of the RMSI associated with the two SSBs comprises:
- a start symbol of a CORESET of first RMSI associated with the first SSB is located on a first symbol in the slot, and/or, a start symbol of a CORESET of second RMSI associated with the second SSB is located on an eighth symbol in the slot; and/or
- a start symbol of a CORESET of first RMSI associated with the first SSB is located on an eighth symbol in the slot, and/or, a start symbol of a CORESET of second RMSI associated with the second SSB is located on a first symbol in the slot.

3. The method according to claim 1, wherein candidate position information of the CORESETs of the RMSI in one-to-one association with the two SSBs comprises:
- a start symbol of a CORESET of first RMSI associated with the first SSB is located on a first symbol in the slot, and/or, a start symbol of a CORESET of second RMSI associated with the second SSB is located on an eighth symbol in the slot; and/or
- a start symbol of a CORESET of first RMSI associated with the first SSB is located on an eighth symbol in the slot, and/or, a start symbol of a CORESET of second RMSI associated with the second SSB is located on a first symbol in the slot.

4. An information processing method, comprising:
determining, by a network device, candidate position information of two synchronization signal blocks (SSBs) and candidate position information of control resource sets (CORESETs) of remaining minimum system information (RMSI) in one-to-one association with the two SSBs in one slot, so that the two SSBs and physical downlink control channels (PDCCHs) of the RMSI in the CORESETs of the RMSI in one-to-one association with the two SSBs are transmitted in one slot;
wherein candidate position information of the two SSBs in the one slot comprises:
- a first SSB of the two SSBs is located on a fourth symbol to a seventh symbol in the one slot; and a second SSB of the two SSBs is located on an eleventh symbol to a fourteenth symbol in the one slot;
wherein a time domain length of the CORESET of the RMSI comprises:
- at most three symbols are allocated for a time domain length of the CORESET of the first RMSI; and/or
- at most three symbols are allocated for a time domain length of the CORESET of the second RMSI.

5. A network device, comprising:
a processor and a memory for storing a computer program that is executable on the processor, wherein:
the processor is configured to execute the computer program to perform steps of the information processing method according to claim 4.

6. The method according to claim 4, wherein candidate position information of the CORESETs of the RMSI associated with the two SSBs comprises:
- a start symbol of a CORESET of first RMSI associated with the first SSB is located on a first symbol in the slot, and/or, a start symbol of a CORESET of second RMSI associated with the second SSB is located on an eighth symbol in the slot; and/or
- a start symbol of a CORESET of first RMSI associated with the first SSB is located on an eighth symbol in the slot, and/or, a start symbol of a CORESET of second RMSI associated with the second SSB is located on a first symbol in the slot.

7. The method according to claim 4, wherein candidate position information of the CORESETs of the RMSI in one-to-one association with the two SSBs comprises:
- a start symbol of a CORESET of first RMSI associated with the first SSB is located on a first symbol in the slot, and/or, a start symbol of a CORESET of second RMSI associated with the second SSB is located on an eighth symbol in the slot; and/or
- a start symbol of a CORESET of first RMSI associated with the first SSB is located on an eighth symbol in the slot, and/or, a start symbol of a CORESET of second RMSI associated with the second SSB is located on a first symbol in the slot.

8. A terminal device, comprising: a processor and a memory for storing a computer program that is executable on the processor, wherein:
the processor is configured to execute the computer program to perform:
receiving, by a terminal device, two synchronization signal blocks (SSBs) sent by a network device in one slot, and detecting physical downlink control channels (PDCCHs) of remaining minimum system information (RMSI) on control resource sets (CORESETs) of the RMSI in one-to-one association with the two SSBs,
wherein candidate position information of the two SSBs in the one slot comprises:
- a first SSB of the two SSBs is located on a fourth symbol to a seventh symbol in the one slot; and a second SSB of the two SSBs is located on an eleventh symbol to a fourteenth symbol in the one slot;
wherein a time domain length of the CORESET of the RMSI comprises:
- at most three symbols are allocated for a time domain length of the CORESET of the first RMSI; and/or
- at most three symbols are allocated for a time domain length of the CORESET of the second RMSI.

* * * * *